United States Patent [19]

Stewart

[11] Patent Number: 4,708,814

[45] Date of Patent: Nov. 24, 1987

[54] WATER TREATMENT COMPOSITIONS AND PROCESSES

[76] Inventor: Claude M. Stewart, 345 N. Beaverdam Rd., Asheville, N.C. 28804

[21] Appl. No.: 914,654

[22] Filed: Oct. 2, 1986

[51] Int. Cl.$^4$ ............................................. C02F 1/00
[52] U.S. Cl. ................................................. 252/181
[58] Field of Search ..................................... 252/181

[56] References Cited

U.S. PATENT DOCUMENTS

| | | | |
|---|---|---|---|
| 3,235,492 | 2/1966 | Andresen et al. | 252/181 |
| 4,067,806 | 1/1978 | Mauceri | 252/181 |
| 4,450,092 | 5/1984 | Huang | 252/181 |
| 4,559,143 | 12/1985 | Asada et al. | 210/727 |
| 4,582,627 | 4/1986 | Carlsson | 252/181 |

FOREIGN PATENT DOCUMENTS 1188394  4/1970  United Kingdom.

Primary Examiner—Robert A. Wax
Attorney, Agent, or Firm—Cushman, Darby & Cushman

[57] ABSTRACT

A composition for use for the coagulation of suspended solids in industrial or municipal waste water, and raw river water is disclosed. The composition comprises a cationic polymer, aluminum chlorhydrate and mica. A method of treating water is also disclosed.

12 Claims, No Drawings

WATER TREATMENT COMPOSITIONS AND PROCESSES

BACKGROUND OF THE INVENTION

Heretofore, compositions such as aluminum chlorhydrate, aluminum chloride and aluminum sulphate have been used in coagulating water, such as river water, or industrial discharge.

It is known that cationic polymers or aluminum compounds have been used for coagulation, and to some extent these compounds have been employed together. Further, the use of clay in treating water alone or in combination with certain aluminum compounds is known.

Several U.S. patents disclose the use of cationic polymeric coagulants with aluminum compounds, e.g. such as U.S. Pat. No. 4,559,143 to Asada et al. However, none of these patents employ aluminum chlorhydrate in their compounds.

SUMMARY OF THE INVENTION

An object of the present invention is to provide a composition and method with improved ability to coagulate suspended solids in waste water or turbid water.

The present invention relates to a composition for use in the coagulation of suspended solids in industrial and municipal waste water, or raw river water. The composition is essentially composed of (i) a cationic polymer, (ii) aluminum chlorhydrate, and (iii) mica. Specifically, the composition comprises:

(i) 10-90 wt. % of a cationic polymer,
(ii) 10-90 wt. % of a 50% aqueous solution of aluminum chlorhydrate;
(iii) 0-2.0 wt. % of mica.

The composition exhibits an improved capability to coagulate suspended solids in waste water.

Further, the present invention relates to a process of treating water using the composition of the present invention.

DETAILED DESCRIPTION OF THE INVENTION

The composition of the present invention comprises or consists of (i) a cationic polymer, (ii) aluminum chlorhydrate, and optionally (iii) mica. Specifically, the composition comprises:

(i) 10-90 wt. % cationic polymer,
(ii) 10-90 wt. % of a 50% aqueous solution of aluminum chlorhydrate, and
(iii) 0-2.0 wt. % of mica.

When using an aluminum chlorhydrate powder (not solution) the composition comprises:

(i) 18-95 wt. % cationic polymer,
(ii) 5-82 wt. % aluminum chlorhydrate (dry), and
(iii) 0-4 wt. % of mica.

Preferred and advantageous composition ranges are:
(i) 24-67 wt. % cationic polymer,
(ii) 32-75 wt. % aluminum chlorhydrate (50% solution), and
(iii) 0.5-2.0 wt. % mica Preferred specific compositions include:

Composition (A)
67.0% cationic polymer
32.0% aluminum chlorhydrate
(50% solution)
1.0% wet ground mica

Composition (B)
50.0% cationic polymer
49.5% aluminum chlorhydrate
(50% solution)
0.5% wet ground mica

Composition (C)
24.0% cationic polymer
75.0% aluminum chlorhydrate
(50% solution)
1.0% wet ground mica The cationic polymer employed should be water soluble. For example, the polymer can be a cationic quaternary ammonium polyelectrolyte such as poly(dimethyldiallylammonium chloride) having the formula:

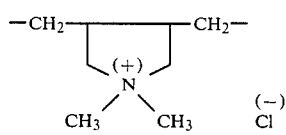

(CAS Registry No. 26062-79-3)

The cationic polymer is generally a liquid organic, highly cationic, polyquaternary amine, advantageously with a specific gravity @25° C. ($H_2O = 1$ @39.2° F.) of 1.05–1.10.

A cationic polyamine, with a medium molecular weight, is used in order to increase the capacity of the product to neutralize charges on negatively charged turbidity particles and also assist in the agglomeration process of flocculation.

The polyamine selected should have the ability to readily combine with the aluminum chlorhydrate and to function effectively over a wide pH range. Suitable cationic polymers are described in the Panzer Pat. Nos. 4,053,512, Re. 28,807 and Re. 28,808, the entire disclosures of which are hereby incorporated by reference. Other suitable polyamine quaternaries are disclosed in the Encyclopedia of Chemical Technology, Vol. 10, 1980, pp. 501–504, hereby incorporated by reference. Suitable cationic polymers are sold by Chemlink, Inc. of Plano, TX. (e.g. Nos. 509 and 550-40) or Keystone Laboratories in Decatur, AL. (e.g. Nos. KF-8823, 8840, 8820, 8822, 8823, 8856), or American Cyanamide (e.g. Nos. 577-C, 587).

Advantageously the cationic polymer is a polyquaternary polymer prepared from epichlorohydrin and dimethyl amine or other substituted amines. Preferred polyamines are disclosed in Re 28,807 and Re 28,808 and U.S. Pat. Nos. 3,894,944, 3,894,945, 3,894,946, 3,894,947 and 3,894,948, the entire disclosures of which are hereby incorporated by reference.

The aluminum chlorhydrate is generally used as a 50 wt. % aqueous solution. The percentage of water in the solution, however is a matter of choice (even aluminum chlorhydrate powder can be used). Advantageously the aluminum chlorhydrate solution has a specific gravity @60° F. of 1.330–1.350.

The aluminum chlorhydrate is used to cause a "polishing" effect on the treated water. The polishing property of an aluminum compound has been observed for many years and is basically due to the very high charge (cationic capacity of the $Al^{+++}$ ion) and its ability (by hydrolysis) to form in water, multinuclear soluble hydrolysis species that are probably linear polymers.

An aluminum compound is needed which contains a high availability of aluminum, that does not have a great pH lowering effect on the treated water and yields a pH such as to readily combine with a highly charged medium molecular weight polyquaternary amine. Aluminum chlorhydrate fulfils each of these criteria.

Aluminum chlorhydrate has a very high degree of available aluminum. It is this availability (2.2 times as much as aluminum chloride and 5.6 times as much as aluminum sulfate), which makes it useful in the subject invention. It does not appreciably lower the pH of the dosed water and it has the ability to combine with the polyquaternary ammonium polymer.

Below is Table A, which shows jar test data for the effectiveness of aluminum chlorhydrate. The results show that a dosage of 37.5 mg./1 was needed in order to obtain a resultant turbidity of 0.56 NTU.

TABLE A

| ALUMINUM CHLORHYDRATE | | |
|---|---|---|
| Sample | mg./l | NTU |
| (1) | 5.0 | 30.0 |
| (2) | 10.0 | 20.0 |
| (3) | 15.0 | 16.0 |
| (4) | 20.0 | 11.0 |
| (5) | 25.0 | 10.8 |
| (6) | 27.5 | 6.8 |
| (7) | 30.0 | 3.7 |
| (8) | 32.5 | 1.8 |
| (9) | 35.0 | 0.83 |
| (10) | 37.5 | 0.56 |

NOTES:
Raw water is 980 ml. of Ashville, NC tap water with 20 ml. of a 1.0% Bentonite Clay solution added - Turbidity = 29 NTU. Flash mix at 100 rpm, for 3 minutes. Floc mix at 30 rpm, for 15 minutes. Settling time is 15 minutes.

A suitable aluminum chlorhydrate (Enchlor) can be obtained from Courtney Industries, Inc. of Baltimore, Md.

The mica of the subject invention is generally muscovite mica. Advantageously the mica has the formula $H_2KAl_3(SiO_4)_3$ and is prepared by the wet grinding process. An advantageous nominal particle size is about 325 mesh and the particle shape is a very thin flake having the highest ratio of surface to thickness of any inert pigment. A wide variety of mesh sizes may be used. Advantageously, the mica has an apparent density (Scott Volumeter) of about 10 lbs./cu.ft, and a specific gravity of 2.8-3.0.

The mica is used for the purpose of adding an inert pigment in order to assist the coagulation/flocculation process from the standpoint of presenting an extremely small "site" for the floc to build on. The mica is not electrically charged. It also aids, in a limited way, the process of apparent color removal. The mica does not itself coagulate the turbidity particles but only adds an available site. Below are results of 37 jar tests" conducted on the wet ground mica alone. As the tests indicate, an increase in dosage also increases the turbidity, thus proving that the mica adds particles and does not have any per se coagulating or flocculating properties.

TABLE B

| WET GROUND MICA | | |
|---|---|---|
| Sample | mg./l | NTU |
| (1) | 5.0 | 28.0 |
| (2) | 25.0 | 29.0 |
| (3) | 50.0 | 37.0 |
| (4) | 75.0 | 40.0 |
| (5) | 100.0 | 55.0 |
| (6) | 125.0 | 63.0 |

NOTES:
Raw water is 980 ml. of Ashville, NC tap water with 20 ml. of a 1.0% Bentonite Clay solution added - Turbidity = 28 NTU. Flash mix at 100 rpm, for 3 minutes. Floc mix at 30 rpm, for 15 minutes. Settling time is 15 minutes.

A suitable wet ground mica is alsimica which can be obtained from Franklin Mineral Products of Wilmington, Ma. Another suitable mica is dry ground muscovite mica which can be obtained from U.S. Mica Co., Kings Mountain, N.C.

The method of combining the three ingredients to form the composition of the subject invention is as follows:

The mica should be added to the aluminum chlorhydrate (advantageously 50% aqueous solution) and mixed at a moderate speed (approximately 1000 RPM) for at least five minutes. Thereafter mixing RPM's should be slowed to approximately 300 RPM's while the polymer component is slowly added to the solution. Mixing should continue for at least ten minutes. The material can then be transferred to shipping containers, i.e. drums or tankers.

The composition can comprise, consist essentially of or consist of the stated materials. Unless otherwise indicated, all parts and percentages are by weight.

The composition is used for the treatment of waste waters or river waters, which have a high or low suspended solids content. The treatment can be used with water from industrial processes before it is returned to the river. The composition is usefully added at the rate of from 1-100 mg./liter of water to be treated depending on water solids content. The composition effectively causes coagulation and settlement of the solids.

"Nephelometric Turbidity Unit" or NTU, is the measurement of the turbidity or "cloudiness" of a solution as determined by the use of a Nephelometer. This Nephelometer measures turbidity in a different manner than a standard spectrophotometer in the following way—A spectrophotometer uses a light source, with the sample placed between it and the light "receiver" in order to measure % transmittance. This is not an accurate measurement since a colored liquid (even if it did not contain turbidity particles) would absorb some of the light and therefore register a decrease in transmittance. This decrease in transmittance would indicate an increase in turbidity. The turbidity reading would be incorrect since the colored liquid contained no "particles". A Nephelometer, on the other hand, has its light receiver placed at a 90% angle from the light source, so that it receives light which has actually been reflected off particles in the sample. Therefore, this is a true measure of turbidity.

The "Federal Register", Vol. 40. No. 248-Wednesday, Dec. 24, 1975, at section 141.22, page 59572 and section 141.13, page 59571 states the EPA regulations concerning the limit of 1.0 NTU for potable water.

The following examples illustrate the invention in more detail.

EXAMPLES

For Tables 1-4, the product tested was applied to Baltimore raw water with the addition of a 1% solution of Bentonite clay. The resultant turbidity was 125 NTU and the appearance of the water was opaque to cloudy. One liter jar test solutions were used on a 6-paddle Phipps and Byrd gang stirrer.

In each test the Flash mixing time (1st stage mixing when coagulant comes into contact with particles) was 3 minutes; the flocculation time was 15 minutes; and the settlement time was 30 minutes. In Tables 1-4 a Hach 2100A Tubidmeter (Nephelometer) was used to determine the NTU value.

The composition of the subject invention tested comprised:
(i) 67 wt. % cationic polymer (Keystone KF-8823)
(ii) 32 wt. % aluminum chlorhydrate (Courtney Industries, Enchlor, 50% Solution), and
(iii) 1 wt. % wet ground mica (Franklin Mineral Products, Alsimica No. 12)

TABLE 1
INVENTIVE COMPOSITION

| Sample | mg./l | NTU | COMMENTS |
|---|---|---|---|
| (1) | 1.0 | 0.91 | |
| (2) | 2.0 | 0.91 | |
| (3) | 3.0 | 0.91 | |

NOTE: Begin Feeding Lower Dosage

| | | | |
|---|---|---|---|
| (4) | 0.1 | 4.2 | |
| (5) | 0.3 | 0.71 | |
| (6) | 0.5 | 0.42 | |
| (7) | 0.7 | 0.38 | Best Dosage |
| (8) | 0.9 | 0.49 | |

NOTES:
Best Dosage for this composition was 0.7 mg/l with a resultant NTU of 0.38 NTU

TABLE 2
COMMERCIAL ALUMINUM CHLORHYDRATE
(50% Solution as $Al_2(OH)_5Cl_x$)

| Sample | mg./l | NTU | COMMENTS |
|---|---|---|---|
| (1) | 20 | 1.7 | |
| (2) | 40 | 1.8 | |
| (3) | 60 | 2.5 | |
| (4) | 80 | 3.1 | |
| (5) | 100 | 4.0 | |
| (6) | 200 | 9.5 | |

NOTE: Begin Lower Dosages

| | | | |
|---|---|---|---|
| (7) | 10 | — | Too High - Didn't Read |
| (8) | 12 | — | Too High - Didn't Read |
| (9) | 14 | 1.1 | Best |
| (10) | 15 | 0.9 | Results |
| (11) | 16 | 1.2 | |
| (12) | 18 | 1.4 | |

NOTES:
15 mg./l dosage is best at resultant turbidity of 0.9 NTU

TABLE 3
LIQUID ALUMINUM CHLORIDE (AlCl) 32° BAUME

| Sample | mg./l | NTU | COMMENTS |
|---|---|---|---|
| (1) | 55 | 5.6 | Best Results |

NOTES:
Lower and higher dosages resulted in increased turbidity - supernate remained cloudy

TABLE 4
LIQUID ALUMINUM SULPHATE ($Al_2SO_4$)

| Sample | mg./l | NTU | COMMENTS |
|---|---|---|---|
| (1) | 70 | 5.5 | Best Results |

NOTES:
Lower and higher dosages resulted in increased turbidity - supernate remained cloudy The purpose of the following tests was to evaluate the invention aganist other coagulants i.e. aluminum sulfate (alum), Ultrion (a product from Nalco Chemical Co.) and, in some cases aluminum chloride (AlCl). Prior to each series of tests, a description of the raw water is given. The inventive composition used in each case is the same as for Table 1. In the remaining tables, a Hach ratio Nephelometer (turbidmeter) was used. The water treated was Swannanoa River (Ashville, N.C. water—raw water turbidity equals 47 NTU

TABLE 5
Inventive Composition

| Sample | mg./l | NTU |
|---|---|---|
| (1) | 3.0 | 5.00 |
| (2) | 4.0 | 1.16 |
| (3) | 5.0 | 0.47 |

TABLE 6
ULTRION

| Sample | mg./l | NTU |
|---|---|---|
| (1) | 40.0 | 7.60 |
| (2) | 50.0 | 4.90 |
| (3) | 70.0 | 0.35 |

TABLE 7
ALUMINUM SULFATE

| Sample | mg./l | NTU |
|---|---|---|
| (1) | 40.0 | 5.30 |
| (2) | 75.0 | 2.00 |
| (3) | 100.0 | 0.52 |

The next series of tests used Ashville, N.C. tap water (980 ml.) with 20 ml. of a 1.0% Bentonite Clay solution added. The turbidity of this solution was 29 NTU. The inventive composition used (Table 8) is the same as that for Tables 1 and 5.

TABLE 8
Inventive Composition

| Sample | mg./l | NTU |
|---|---|---|
| (1) | 1.0 | 9.80 |
| (2) | 2.0 | 0.63 |
| (3) | 3.0 | 0.16 |
| (4) | 4.0 | 0.24 |
| (5) | 5.0 | 0.26 |
| (6) | 6.0 | 9.50 |

TABLE 9
ULTRION

| Sample | mg./l | NTU |
|---|---|---|
| (1) | 45.0 | 14.60 |
| (2) | 50.0 | 10.90 |
| (3) | 55.0 | 06.50 |
| (4) | 60.0 | 01.50 |
| (5) | 65.0 | 00.40 |
| (6) | 70.0 | 00.60 |

TABLE 10

| ALUMINUM SULFATE | | |
|---|---|---|
| Sample | mg./l | NTU |
| (1) | 57.0 | 7.30 |
| (2) | 60.0 | 1.50 |
| (3) | 66.0 | 0.78 |
| (4) | 84.0 | 0.67 |
| (5) | 87.0 | 0.62 |
| (6) | 90.0 | 0.58 |

Tables 11 through 18 show the superiority of the inventive composition over other coagulants in treating (coagulating/flocculating) water with an extremely high and low pH. An acid solution was used to decrease the raw water pH and a sodium hydroxide solution was used to increase the pH. In all cases the raw water consisted of 980 ml. tap water with 20 ml. of a 1.0% bentonite clay solution added. The Riverclear composition used (Tables 11 and 15) was the same as that used in Tables 1–5 and 8.

TABLE 11

| Inventive Composition | | | |
|---|---|---|---|
| Sample | pH | mg./l | NTU |
| (1) | 8.0 | 4.0 | 1.66 |
| (2) | 7.5 | 4.0 | 0.92 |
| (3) | 7.0 | 4.0 | 0.38 |
| (4) | 10.4 | 4.0 | 1.42 |
| (5) | 10.0 | 4.0 | 0.86 |
| (6) | 9.0 | 4.0 | 0.59 |

TABLE 12

| ULTRION | | | |
|---|---|---|---|
| Sample | pH | mg./l | NTU |
| (1) | 7.7 | 45.0 | 0.24 |
| (2) | 8.0 | 45.0 | 0.20 |
| (3) | 8.5 | 45.0 | 0.26 |
| (4) | 9.0 | 45.0 | 0.39 |
| (5) | 9.5 | 45.0 | 0.83 |
| (6) | 10.0 | 45.0 | 1.91 |

TABLE 13

| ALUMINUM SULFATE | | | |
|---|---|---|---|
| Sample | pH | mg./l | NTU |
| (1) | 7.5 | 34.0 | 3.3 |
| (2) | 8.0 | 34.0 | 1.45 |
| (3) | 8.5 | 34.0 | 1.82 |
| (4) | 9.0 | 34.0 | 2.70 |
| (5) | 9.5 | 34.0 | 26.0 |
| (6) | 10.5 | 34.0 | 28.0 |

TABLE 14

| ALUMINUM CHLORIDE | | | |
|---|---|---|---|
| Sample | pH | mg./l | NTU |
| (1) | 7.5 | 25.0 | 0.47 |
| (2) | 8.0 | 25.0 | 0.36 |
| (3) | 8.5 | 25.0 | 3.40 |
| (4) | 9.0 | 25.0 | 17.50 |
| (5) | 9.4 | 25.0 | 19.80 |
| (6) | 10.0 | 25.0 | 19.90 |

TABLE 15

| Inventive Composition | | | |
|---|---|---|---|
| Sample | pH | mg./l | NTU |
| (1) | 5.3 | 4.0 | 0.81 |
| (2) | 5.1 | 4.0 | 0.69 |
| (3) | 4.8 | 4.0 | 0.68 |

TABLE 15-continued

| Inventive Composition | | | |
|---|---|---|---|
| Sample | pH | mg./l | NTU |
| (4) | 3.6 | 4.0 | 0.86 |
| (5) | 3.7 | 4.0 | 0.88 |
| (6) | 3.5 | 4.0 | 0.56 |

TABLE 16

| ULTRION | | | |
|---|---|---|---|
| Sample | pH | mg./l | NTU |
| (1) | 6.5 | 45.0 | 0.28 |
| (2) | 6.0 | 45.0 | 0.32 |
| (3) | 5.1 | 45.0 | 0.39 |
| (4) | 4.1 | 45.0 | 0.47 |
| (5) | 3.1 | 45.0 | 0.97 |
| (6) | 2.9 | 45.0 | 1.31 |

TABLE 17

| ALUMINUM SULFATE | | | |
|---|---|---|---|
| Sample | pH | mg./l | NTU |
| (1) | 3.0 | 34.0 | 0.47 |
| (2) | 2.8 | 34.0 | 0.73 |
| (3) | 3.2 | 34.0 | 0.67 |
| (4) | 3.5 | 34.0 | 0.39 |
| (5) | 3.8 | 34.0 | 0.35 |
| (6) | 3.7 | 34.0 | 0.45 |

TABLE 18

| ALUMINUM CHLORIDE | | | |
|---|---|---|---|
| Sample | pH | mg./l | NTU |
| (1) | 6.5 | 25.0 | 0.37 |
| (2) | 6.0 | 25.0 | 0.35 |
| (3) | 5.0 | 25.0 | 0.44 |
| (4) | 3.9 | 25.0 | 0.48 |
| (5) | 3.1 | 25.0 | 0.93 |
| (6) | 2.9 | 25.0 | 1.81 |

Tables 19 and 20 show results for the above-described Composition (B) and (C) in the treatment of raw Swannanoa River water consisting of 980 ml. tap water with 20 ml. of a 1% bentonite clay solution added. The particular components used in these tables are the same as the above tables.

TABLE 19

| COMPOSITION (B) | | |
|---|---|---|
| Sample | mg./l | NTU |
| (1) | 7.5 | 18.30 |
| (2) | 10.0 | 14.30 |
| (3) | 12.5 | 2.20 |
| (4) | 15.0 | 0.34 |
| (5) | 17.5 | 0.28 |
| (6) | 20.0 | 0.20 |
| (7) | 22.5 | 0.30 |
| (8) | 25.0 | 0.35 |
| (9) | 27.5 | 0.96 |
| (10) | 30.0 | 1.22 |

TABLE 20

| COMPOSITION (C) | | |
|---|---|---|
| Sample | mg./l | NTU |
| (1) | 10.0 | 19.00 |
| (2) | 15.0 | 12.00 |
| (3) | 20.0 | 3.30 |
| (4) | 21.0 | 2.30 |
| (5) | 22.0 | 0.50 |
| (6) | 23.0 | 0.29 |
| (7) | 24.0 | 0.30 |

TABLE 20-continued

| | COMPOSITION (C) | |
|---|---|---|
| Sample | mg./l | NTU |
| (8) | 25.0 | 0.51 |
| (9) | 30.0 | 0.25 |

It is quite evident from the above data that the inventive compositions are superior to the other major coagulants in all areas of significant coagulation chemistry on natural river waters or similar influent flows. Some of these benefits are:

1. Decrease in coagulant dosage to attain acceptable turbidity levels.
2. The ability of the inventive compositions to coagulate efficiently in waters of fairly neutral pH *and* in waters of pH extremes.
3. Decrease the sludge volume generated.
4. Produce a sludge of superior quality so that drying times for the sludge will be decreased.

While the present invention has been illustrated by detailed descriptions of preferred embodiments, it will be obvious to those skilled in the art that various changes in form and detailed can be made therein without departing from the true scope of the invention. For that reason, the invention must be measured by the claims appended hereto and not by the foregoing preferred embodiments.

What is claimed:

1. A composition for the treatment of water containing suspended solids comprising the combination of:
   (a) a cationic polymer,
   (b) aluminum chlorhydrate
   (c) mica.

2. A composition as in claim 1, comprising:
   (a) 10-90 wt. % cationic polymer;
   (b) 10-90 wt. % of a 50 wt. % aqueous solution of aluminum chlorhydrate; and
   (c) greater than 0 to 2 wt. % wet ground mica.

3. A composition as in claim 1 comprising:
   (i) 18-95 wt. % cationic polymer,
   (ii) 5-82 wt. % aluminum chlorhydrate, and
   (iii) greater than 0 to 4 wt. % mica.

4. A composition as in claim 1 comprising:
   (i) 24-67 wt. % cationic polymer,
   (ii) 32-75 wt. % of a 50% aqueous solution of aluminum chlorhydrate, and
   (iii) 0.5-2 wt. % mica.

5. A composition as in claim 1, wherein said cationic polymer is a water soluble quaternary. ammonium polyelectrolyte.

6. A composition as in claim 1, wherein said mica has the formula $H_2KAl_3(SiO_4)_3$.

7. A method of formulating a combination composition for the treatment of water containing suspended solids comprising the steps of:
   (a) adding mica to aluminum chlorhydrate;
   (b) mixing the mica and the aluminum chlorhydrate;
   (c) adding a cationic polymer while continuing mixing to form said composition; and
   (d) recovering said combination composition.

8. A method as in claim 7 wherein step (b) comprises the step of mixing at a speed of about 1000 RPM for at least 5 minutes.

9. A method as in claim 7 wherein step (c) comprises the step of adding cationic polymer while mixing at a speed of about 300 RPM, and continuing mixing at a speed of about 300 RPM for at least 10 minutes.

10. A method as in claim 7 wherein the components are added in the following amounts;
    10-90 wt. % cationic polymer
    10-90 wt. % of 50 wt. % aqueous solution of aluminum chlorhydrate; and
    greater than 0 to 2.0 wt. % wet ground mica.

11. A method as in claim 7 wherein said cationic polymer is a water soluble quaternary ammonium polyelectrolyte.

12. A method as in claim 7 wherein said wet ground mica has the formula $H_2KAl_3(SiO_4)_3$.

* * * * *